(12) United States Patent
Lehr et al.

(10) Patent No.: US 7,962,615 B1
(45) Date of Patent: Jun. 14, 2011

(54) MULTI-SYSTEM DEADLOCK REDUCTION

(75) Inventors: Douglas L. Lehr, Tucson, AZ (US);
Franklin E. McCune, Tucson, AZ (US);
David C. Reed, Tucson, AZ (US); **Max
D. Smith**, Tucson, AZ (US)

(73) Assignee: **International Business Machines
Corporation**, Armonk, NY (US)

( * ) Notice: Subject to any disclaimer, the term of this patent is extended or adjusted under 35 U.S.C. 154(b) by 0 days.

(21) Appl. No.: 12/683,747

(22) Filed: Jan. 7, 2010

(51) Int. Cl.
*G06F 15/173* (2006.01)
(52) U.S. Cl. ........................................ 709/224; 709/226
(58) Field of Classification Search .......... 709/223–224, 709/226, 213
See application file for complete search history.

(56) References Cited

U.S. PATENT DOCUMENTS

| | | | | |
|---|---|---|---|---|
| 5,835,766 | A * | 11/1998 | Iba et al. | 718/104 |
| 5,845,117 | A * | 12/1998 | Fujita | 718/107 |
| 6,173,308 | B1 | 1/2001 | Hilditch et al. | |
| 6,219,690 | B1 * | 4/2001 | Slingwine et al. | 718/102 |
| 7,337,290 | B2 * | 2/2008 | Rajamani et al. | 711/163 |
| 7,496,918 | B1 * | 2/2009 | Dice et al. | 709/225 |
| 7,512,606 | B2 * | 3/2009 | Laonipon et al. | 718/105 |
| 7,735,089 | B2 * | 6/2010 | Chan | 710/200 |
| 7,742,403 | B2 * | 6/2010 | Canali et al. | 370/228 |
| 2003/0028638 | A1 | 2/2003 | Srivastava et al. | |
| 2007/0101338 | A1 | 5/2007 | Heddaya et al. | |
| 2007/0143766 | A1 | 6/2007 | Farchi et al. | |
| 2007/0220513 | A1 * | 9/2007 | Hwang | 718/1 |
| 2007/0233924 | A1 * | 10/2007 | Chauvet et al. | 710/240 |
| 2008/0184252 | A1 | 7/2008 | Leeman | |
| 2008/0282244 | A1 | 11/2008 | Wu et al. | |
| 2009/0037888 | A1 | 2/2009 | Tatsuoka et al. | |

OTHER PUBLICATIONS

Chaitanya et al., ": Method and Algorithm for distributed deadlock detection that eliminates the need for construction of a Global Wait for Graph (GWFG) in the distributed database," IP.COM No. IPCOM000169178D, Apr. 9, 2008, 5 pages.

* cited by examiner

*Primary Examiner* — Philip B Tran
(74) *Attorney, Agent, or Firm* — Griffiths & Seaton PLLC

(57) ABSTRACT

Method, system, and computer program embodiments for reducing deadlock in multi-system computing environments are provided. A set of default, current wait times is initialized for resource requests of each of a plurality of resources. A plurality of resource holders and resource waiters is monitored within an address space. If one resource holder of the plurality of resource holders of one of the plurality of resources is determined to be one resource waiter on another of the plurality of resources, a current wait time for the one resource holder is incremented and a deadlock indicator for both the one resource holder and the one resource waiter is activated. Following expiration of a predefined interval, the plurality of resource holders and resource waiters are parsed through to determine an original resource holder, indicating a system deadlock. The resource holder associated with the system deadlock having a lowest current wait time is restarted.

20 Claims, 5 Drawing Sheets

MULTI-SYSTEM DEADLOCK REDUCTION

BACKGROUND OF THE INVENTION

1. Field of the Invention

The present invention relates in general to computers, and more particularly to a method, system, and computer program product for reducing deadlock in multi-system computing environments.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-system computing environments may be used to organize and process large quantities of data.

SUMMARY OF THE INVENTION

In many of today's applications, operable in such multi-system computing environments, there arises a need to obtain system resources that may be held by other threads within the same application, or by other applications across a sysplex. One such application that utilizes this methodology is VSAM (Virtual Storage Access Method) Record Level Sharing (RLS). This mechanism allows for sharing of VSAM datasets down to the record level, and allows such sharing across an entire sysplex.

While mechanisms such as RLS include a deadlock detection scheme, these mechanisms are useful to detect problems with individual records being deadlocked by multiple transactions. Currently there is no mechanism to serialize between a variety of resource types, such as record locks, special locks, enqueues, internal latches, buffers, device reserves, cache entries, and the like. This may lead to deficiencies in deadlock detection and reduction, as a heavily used sysplex utilizing mechanisms such as RLS may have any number of requests for resources pending for various resources on various sysplexes at any one time. In view of the foregoing, a need exists for a mechanism to detect, recover from, and reduce system deadlocks in multiple-system/multiple-sysplex computing environments that more adequately addresses the potential issues described previously.

Accordingly, various embodiments for reducing deadlock in multi-system computing environments are provided. In one such embodiment, by way of example only, a method for reducing deadlock in multi-system computing environments is provided. A set of default, current wait times is initialized for resource requests of each of a plurality of resources. A plurality of resource holders and resource waiters is monitored within an address space of the multi-system computing environment. If one resource holder of the plurality of resource holders of one of the plurality of resources is determined to be one resource waiter on another of the plurality of resources, a current wait time for the one resource holder is incremented and a deadlock indicator for both the one resource holder and the one resource waiter is activated. Subsequent to the expiration of a predefined interval, which of the plurality of resource holders and resource waiters having an active deadlock indicator is aggregated. The plurality of resource holders and resource waiters is parsed through to determine an original resource holder, indicating a system deadlock. Pursuant to detecting the system deadlock, which of the plurality of resource holders associated with the system deadlock having a lowest current wait time is restarted.

In addition to the foregoing exemplary embodiment, various system and computer program embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for reducing deadlock in multiple system computing environments. In one embodiment, these mechanisms monitor requests for all resources held by various address spaces in the computing environment, such as all VSAM RLS address spaces, along with current Program Status Words (PSW) associated with the spaces. These requests may then be transferred to all instances of VSAM RLS jobs, for example, across multiple sysplexes.

Using user-defined time out limits for the various resources, each instance may determine if they are holding resources that are in need by other threads on either the same system or differing systems. If the PSW associated with the offending threads does not change in the allotted time, these threads may then be restarted to allow waiting threads to move forward.

Figure 1:
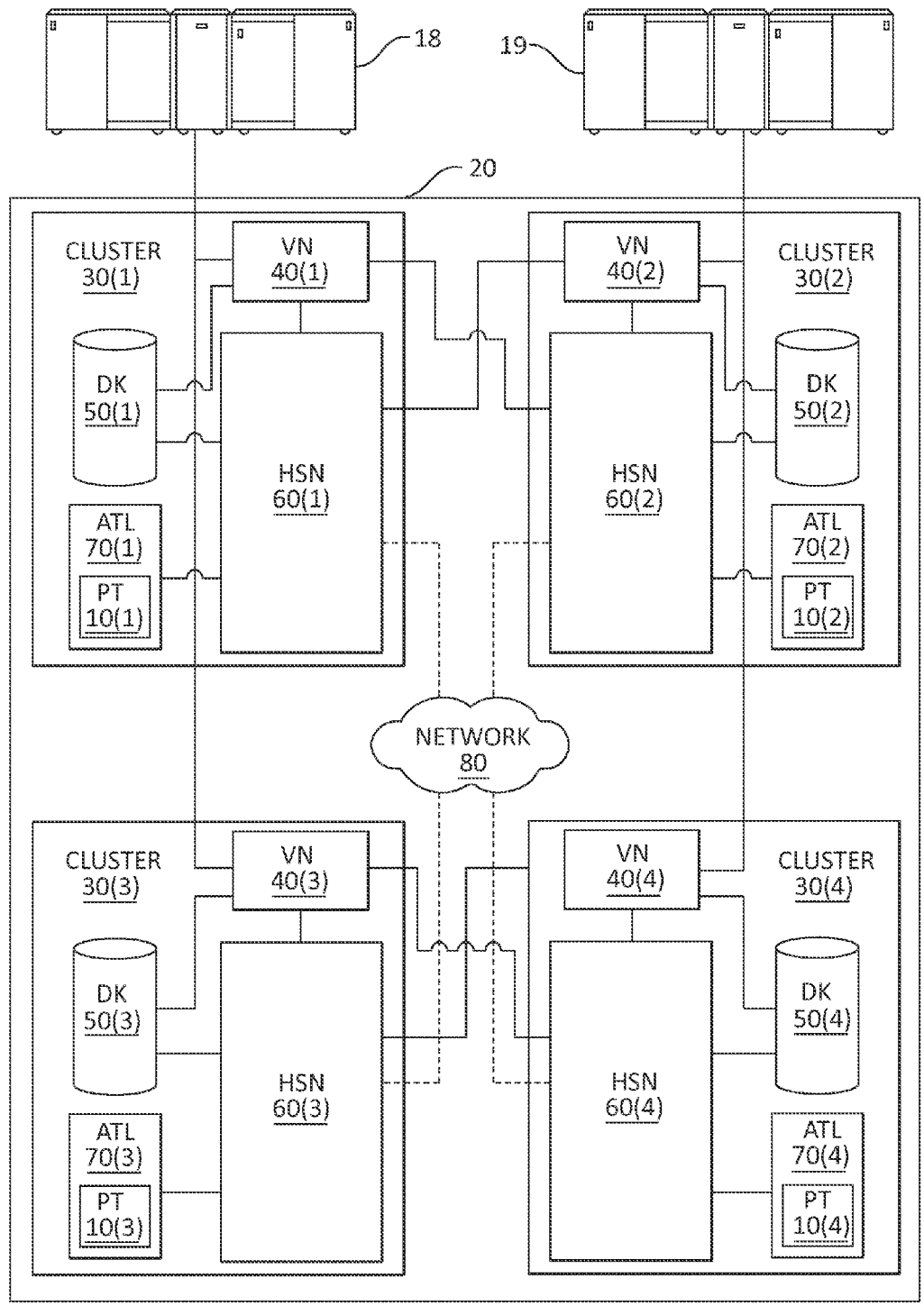
FIG. 1 illustrates an exemplary multi-system data storage computing environment which may implement aspects of the present invention.

FIG. 1 illustrates an exemplary multi-system computing environment, specifically a data storage system 20, in which aspects of the present invention may be implemented. The data storage system 20 provides storage for host systems 18, 19. The data storage system 20, in one embodiment, employs four (4) virtual tape server clusters 30 interconnected by a network 80 with each cluster 30 including a virtualization node ("VN") 40 and a disk storage ("DK") 50 for emulating a tape drive or tape library to hosts 18, 19. Each cluster further comprises a hierarchical storage node ("HSN") 60 for locally moving data between disk storage 50 and an automated tape library ("ATL") 70 as well as remotely moving data between a local disk storage 50 and a remote disk storage.

Examples of disk storage comprise one or more disk drives, for example, arranged as a redundant array of independent disks (RAID) or just a bunch of disks (JBOD), or solid state disk (SSD), etc. Herein, a data storage system having both disk storage 50 and an automated tape library 70 is called a "composite library." An example of a data storage system 20 which may implement the present invention comprises the IBM® TS7700 Virtual Tape Server, which may provide disaster recoverable virtual tape storage functionality to users.

Each host system 18, 19 may be considered a host sysplex as previously described. As can be seen, and as one of ordinary skill in the art will appreciate, each of the systems 18 and 19 are interconnected between storage clusters 30 over network 80. Accordingly, and as previously described, an application operable on one sysplex 18 may hold or wait for a system resource waited for or held by an additional sysplex 19. In addition, one thread of the application may wait on the same resource held by another thread of the same application.

Figure 2:
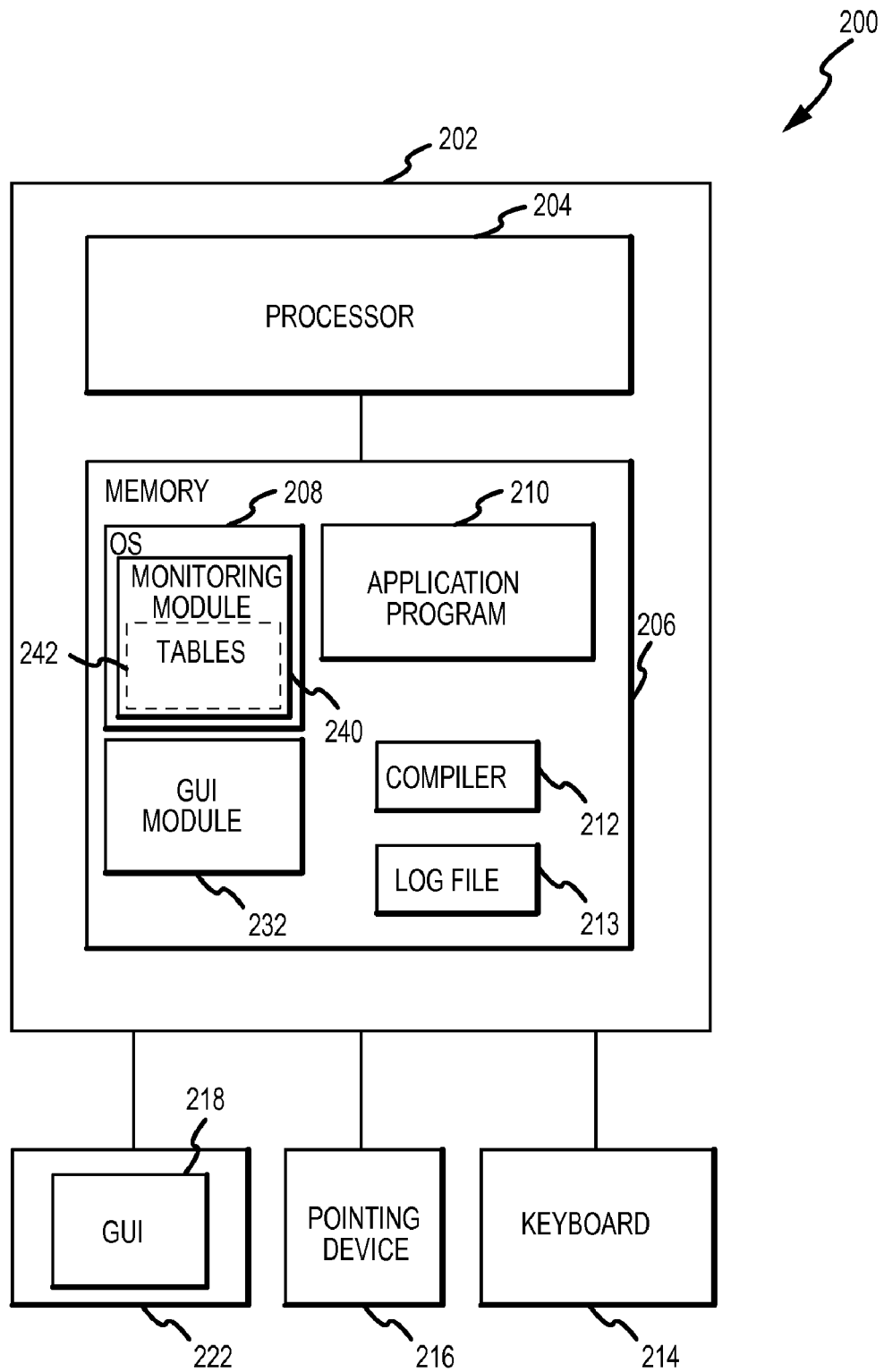
FIG. 2 illustrates an exemplary processing device operational in the multi-system data storage computing environment shown in FIG. 1, in which aspects of the present invention may be implemented.

FIG. 2, following, illustrates various processing and other computing components 200 which, in one embodiment, may comprise portions of the multi-system computing environment depicted in FIG. 1 as one of ordinary skill in the art will appreciate, such as portions of the host sysplexes 18,19. The components 200 include server 202. Server 202 comprises a processor 204 and a memory 206, such as random access memory (RAM). The server 202 is operatively coupled to a display 222, which presents images such as windows to the user on a graphical user interface 218. The server 202 may be coupled to other devices, such as a keyboard 214, a mouse device 216, a printer, etc. Of course, those of ordinary skill in the art will recognize that any combination of the above components, or any number of different components, peripherals, and other devices, may be used with the server 202.

Generally, the server 202 operates under control of an operating system (OS) 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. In one embodiment of the present invention, the monitoring mechanisms as will be further described are facilitated by the OS 208. Although the GUI module 232 is depicted as a separate module, the instructions performing the GUI functions can be resident or distributed in the operating system 208, the application program 210, or implemented with special purpose memory and processors. Server 202 also optionally comprises an external data communication device 230 such as a modem, satellite link, Ethernet card, wireless link or other device for communicating with other computers, e.g. via the Internet or other network.

The server 202 implements a compiler 212 that allows the application program 210 written in a programming language such as COBOL, PL/1, C, C++, JAVA, ADA, BASIC, VISUAL BASIC or any other programming language to be translated into code that is readable by the processor 204. After completion, the application program 210 accesses and manipulates data stored in the memory 206 of the computer 202 using the relationships and logic that was generated using the compiler 212. A number of threads may be operational on application 210 as previously indicated. Each thread may hold or wait to hold a system resource of server 202 or of another portion of the multi-system computing environment. Since server 202 is intended to indicate only a portion of the multi-system computing environment, one of ordinary skill in the art will appreciate that additional application programs 210 may be operational in other systems, etc.

Operating system 208 includes a monitoring module 240. The monitoring module may operate in conjunction with program(s) 210, and other components 200, to implement deadlock monitoring operations for a multi-system computing environment such as that shown in FIG. 1. In one embodiment, the monitoring module 240 is adapted to perform various methodologies that will be further described, such as creating, maintaining, and monitoring a number of tables of resource types identifying a particular system resource, a thread holding the resource (or "resource holder"), a thread waiting for the resource (or "resource waiter"), and an associated PSW, for example. As one skilled in the art will appreciate, however, various additional components of the environment 200 may work individually or in concert to define, initialize, and perform the backup functionality as will be further described.

The mechanisms of the present invention allow for complex resource allocation applications, such as SMSVSAM (the job name of VSAM RLS), to process at full capacity without the potential for deadlocks. In addition, the mechanisms avoid transactions being held because a subsequent thread cannot, for whatever reason, complete. As a result, the efficiency and overall reliability of the multi-system computing environment is enhanced.

In one embodiment of the present invention, a set of default, current wait times are initialized for various resource requests. These resource requests may include enqueues, buffers, locks, caches, latches, and the like as one of ordinary skill in the art will appreciate. An interval value is defined between deadlock checks. The default, current wait times, and interval values may be adjusted by a user, for example, depending on how long the user wishes the mechanisms of the present invention to wait to perform various actions.

As was previously indicated, various tables (as will be described in detail, following), may be constructed. In one embodiment, these tables may be organized by resource type that a thread updates with the name of a respective resource, the Task Control Block (TCB) address, the system to which it belongs to, and whether it holds the resource or is waiting for the resource. The current wait time may be initially set to zero, although this value may also be varied for a particular situation.

The monitoring module 240, for example, may execute functionality added to jobs such as SMSVSAM. This functionality my include implementing a monitoring thread that monitors all tables within a particular address space. If a particular thread is a new resource holder, then the current PSW may be stored in the table. For all other resource holders, the monitor may check if the TCB is a waiter on a different table for another resource. If it is waiting, then a deadlock bit may be turned on in both the holding and waiting entry to notify the thread that this holder is, in fact, waiting on another resource, and the wait count is incremented. If the resource is not waiting on any other resources, then the PSW of the resource may be compared against the TCB's current PSW. If the TCB's current PSW is the same, and it is determined that a waiting resource exists, then the wait count may be incremented. If this is not the case, then the new PSW may be stored, and the wait count reset.

If the monitoring thread detects a resource waiter, it may parse through entries in the same table for the corresponding holder. If none are detected, this indicates that the holder is on a different system. This instance of the monitoring thread will then send the waiter to all other instances of monitoring threads, so that each system will have a copy of the waiting thread. This allows the other systems the knowledge that their requests might be having an affect on other monitoring threads, and action should be taken to start incrementing the wait counts on the resource holders. Once a system detects that it has the thread holding up the resource, the holder may be sent back to that system. This allows every system to have a complete list of resource holder/waiters that are relevant to processing.

A thread may be restarted in one of two ways. First, if the interval has expired, and no evidence is found that the thread is waiting on any of the other known resources, then the thread may go through recovery to back out any changes made, and then rerun using the input parameters originally given. This allows other threads behind the stalled thread to continue on and have a chance to access the resource. In some cases, this repairs a deadlock not detected by any detection algorithms.

The thread may also be restarted pursuant to a deadlock detection algorithm, which will be further explained, following. In one embodiment, for example, subsequent to the expiration of the time interval, this algorithm aggregates all holders and waiters (from each table) having an active deadlock. Since all waiters are transferred to every system at the time the request was issued, there is no need to poll the other systems to gather their holders and waiters. The algorithm parses down a list of all holders collected, and for each entry the algorithm looks for a corresponding wait entry. If one is found, then it checks that resource's holder and looks for another waiter, and so on, until it either doesn't detect another waiter, or it comes back to the original holder.

If a thread holds a resource and is not waiting on any other resource, then that holder is taken off the list of aggregated holders and waiters. In addition, all of their holders searched through may be taken off as well in order to speed up the process. As a next step, the next holder may be selected and the process repeated. However, if a deadlock is detected, then the algorithm then may restart the thread with the lowest wait count (since it was the newest request), in the same way as it restarts a thread that timed out. The corresponding threads are taken off the holding list and the deadlock algorithm continues with the remaining entries. Finally, if the deadlock algorithm decides that a thread on another system needs to be terminated, then a request may be sent to that system requesting that it be restarted.

Figure 3A:
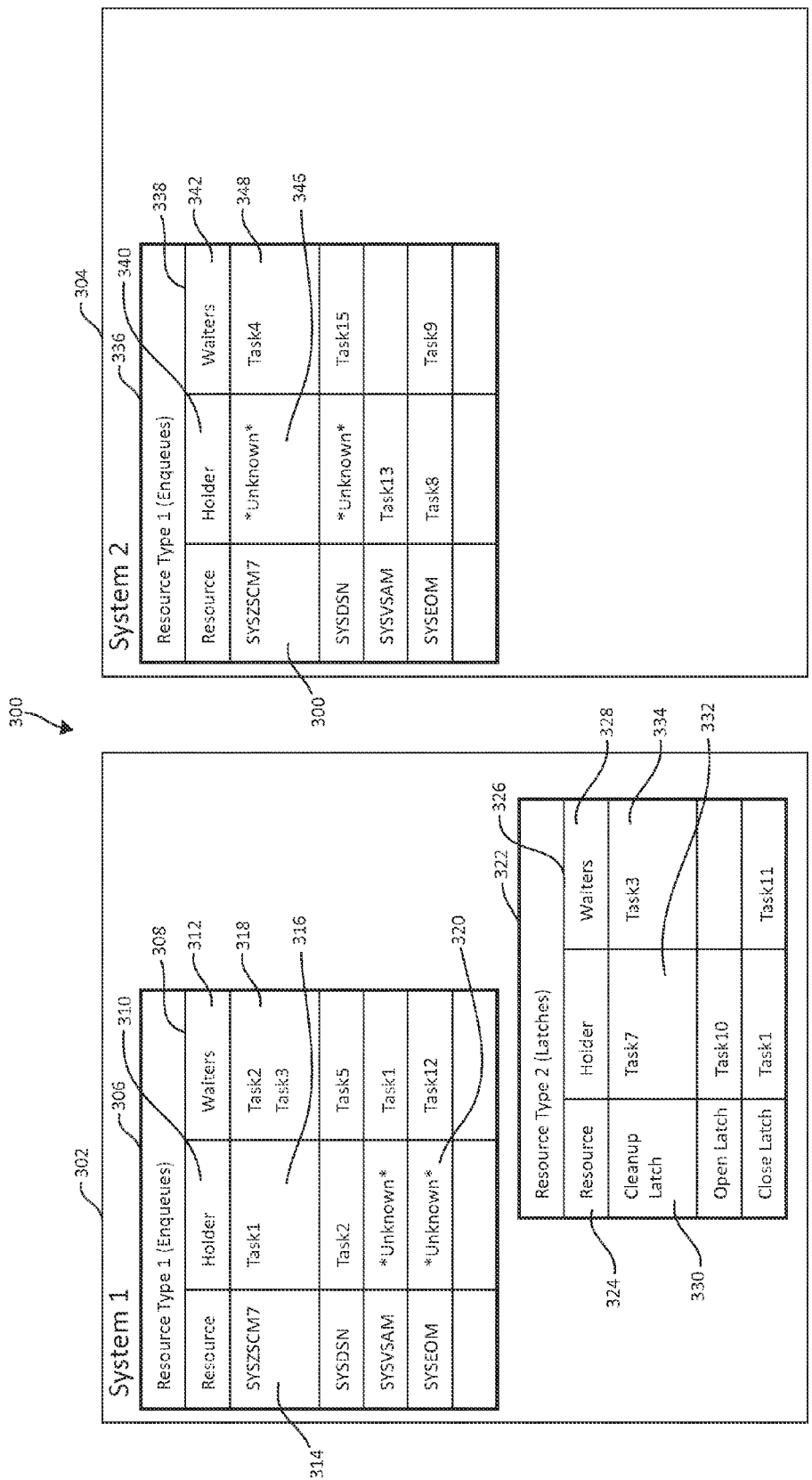
FIG. 3A illustrates various system holders of, and waiters for, resources organized by a resource type in table form.

Turning now to FIG. 3A, an exemplary set of tables 300 for various resource types are shown. In a first system (System 1) 302, a number of enqueues are collected into table 306. For each designated resource (column 308), a holder (column 310) and a waiter (column 312) are specified. For example, for resource SYSZSCM7 314, Task 1 (316) is designated as the reference holder, and Tasks 2 and 3 (318) are designated as the resource waiters.

Continuing to table 322, a number of latches are collectively gathered. Here again, the designated resource (column 324), along with the resource holder (column 326) and resource waiter (column 328) is shown. For example, a certain cleanup latch 330 is held by Task 7 (332) and waited to be held by Task 3 (334).

In a separate system 304 (System 2) of the multi-system computing environment, a table 336 is maintained of enqueues. Here again, a specific resource is designated in column 338, the holder in column 340 and waiters in column 342. In the first entry example, resource SYSZSCM7 (the same resource delineated in table 306), while it is known in system 302 that Task 1 is the holder (ostensibly because task 1 is operable in system 1), it is unknown by system 304, although Task 4 waits for it (as shown in boxes 344, 346, and 348). Similarly, while resource SYSEOM in table 306 has an unknown holder (i.e., box 320), it is known in table 336 that the resource is held by Task 8.

The example entries in tables 306, 322, and 336 demonstrate that tasks may wait on resources held by other systems, and resources on other systems may be held without the knowledge that additional waiters and/or holders may exist on different systems. Additionally, tasks may hold more than one resource, but may only wait on one, since waiting on a resource effectively stalls the thread until the resource is granted.

Figure 3B:
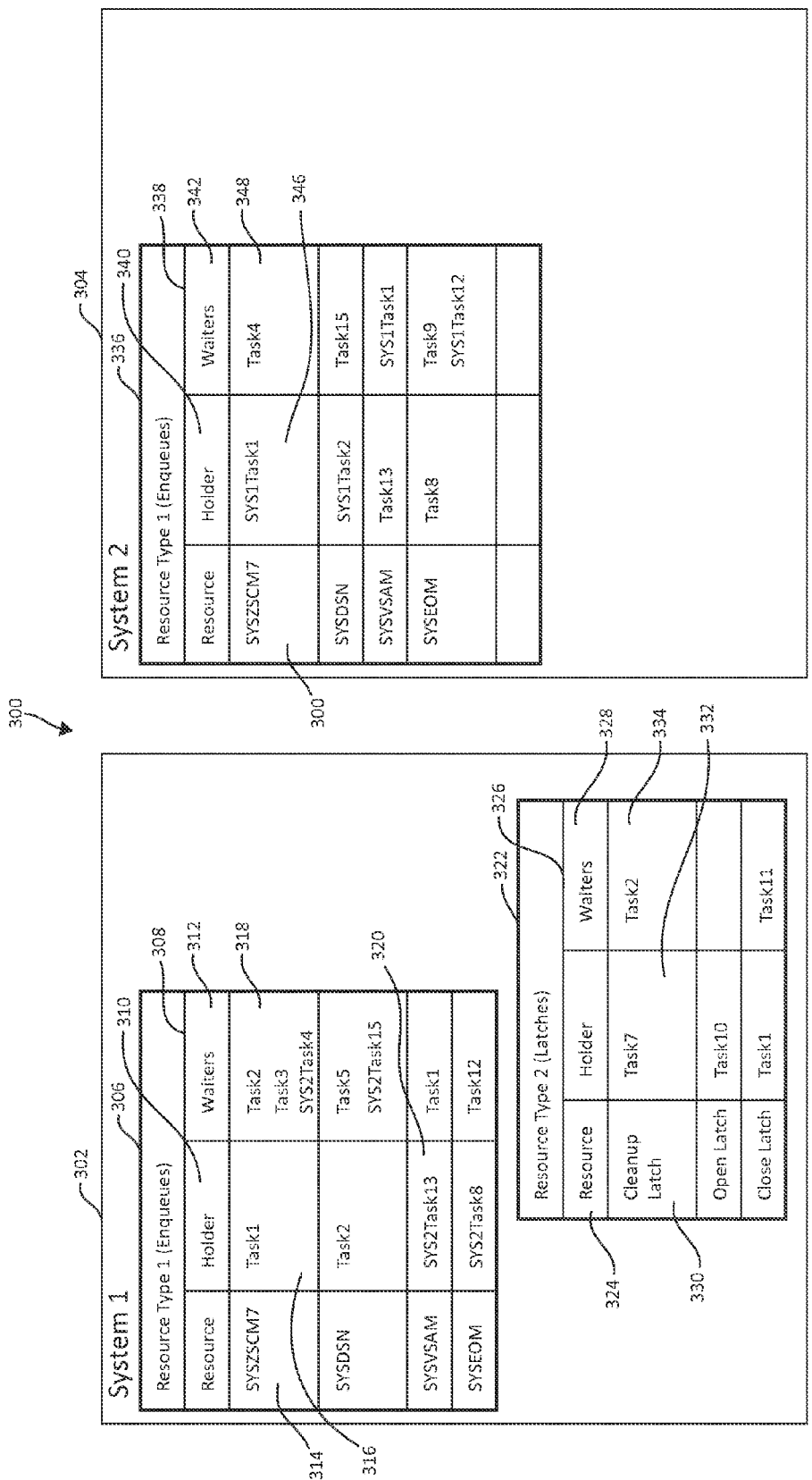
FIG. 3B illustrates the tables previously illustrated in FIG. 3A subsequent to implementations of aspects of the present invention.

Turning now to FIG. 3B, tables 306, 322, and 336 are shown following implementations of various mechanisms of the present invention as previously described. As is seen, Tables 306, 322, and 336 include the various columns and boxes 308-346 previously described indicating specific resources, resource holders, and resource waiters. Here, however, because of intercommunication between systems and their respective tables, the resource holders and resource waiters between systems are known. For example, resource SYSVSAM in table 306 (box 320) was previously held by an unknown holder. Once monitoring activities are commenced, it becomes known that SYSVSAM is held by Task 13 in System 2 (SYS2Task13). Similarly, previously it was unknown which thread held resource SYSZSCM7 in System 2 (box 346). It is now known that this resource is held by Task 1 in System 1 (SYS1Task1).

Once the various tables 306, 322, and 336 are updated accordingly pursuant to the monitoring mechanisms of the present invention, they may then act to detect similar waiters/holders having the active deadlock indicator. To this regard, the mechanisms parse through the holders/waiters to, for example, take a particular resource waiter and find the holder, then moving to the resource the holder is waiting on, etc., until the mechanisms eventually find the original resource holder and waiter, if any. This indicates a system deadlock. The mechanisms then operate to recover from the deadlock in various means as will be subsequently described, such as restarting a particular stalled thread.

Figure 4:
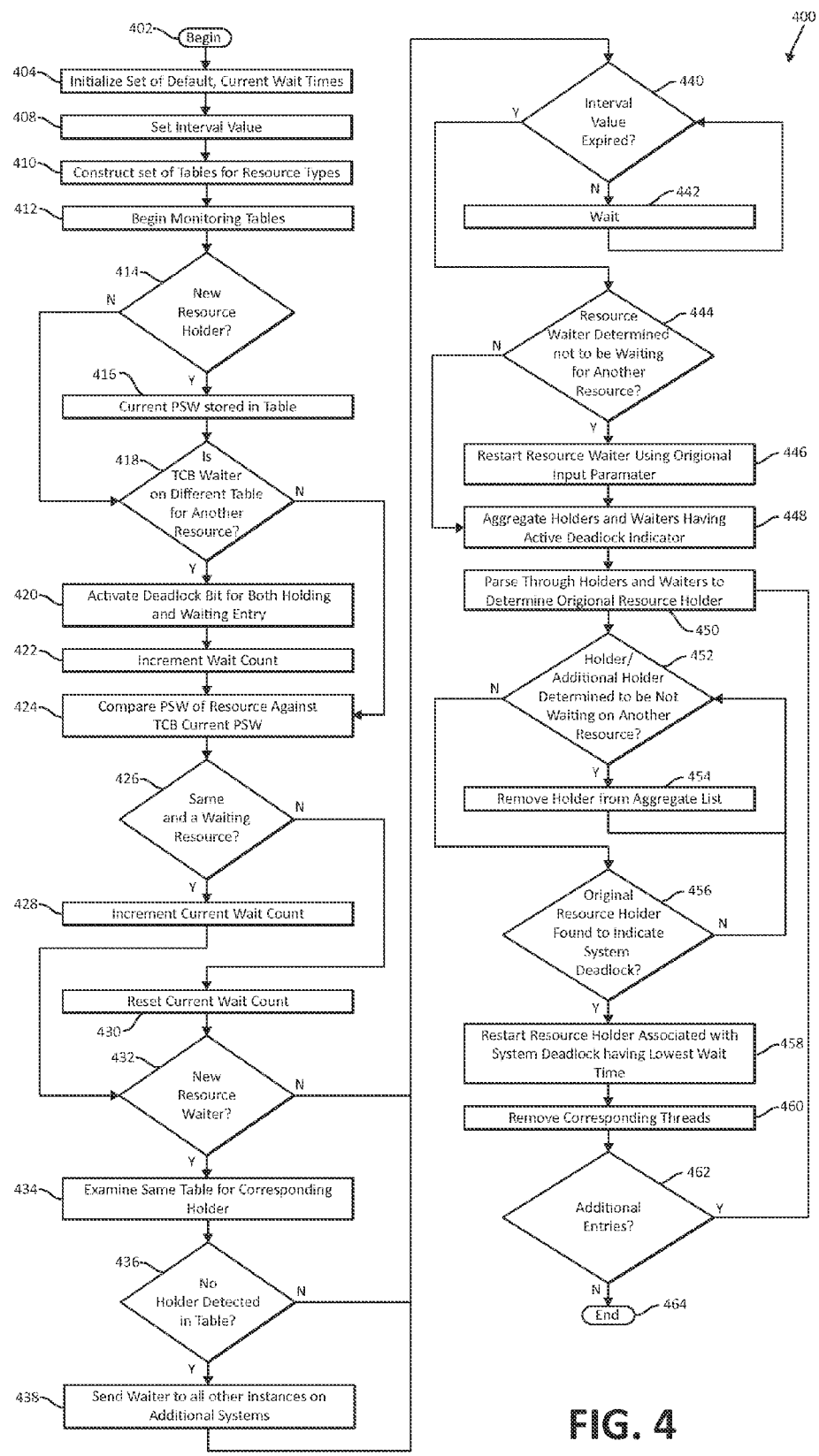
FIG. 4 illustrates an exemplary method for reducing deadlock in multi-system computing environments.

Turning to FIG. 4, following, an exemplary method 400 for reducing deadlock in multi-system computing environments is depicted. Method 400 depicts various mechanisms for monitoring, detecting, and resolving system deadlocks as previously indicated. As one of ordinary skill in the art will anticipate, however, various steps in the method 400 may be modified or omitted to suit a particular implementation or application.

Method 400 begins (step 402) with the initialization of a set of default, current wait times for each of a number of resource requests within the multi-system computing environment (step 404). In step 408, following, an interval value is set between deadlock checks. A set of monitoring tables is constructed for various resource types as previously depicted in FIGS. 3A and 3B (step 410). The monitoring mechanisms then begin to operate to monitor the states of the various resources (step 412).

If a new resource holder is found in a particular system (step 414), it's current PSW is stored in the table, and is sent to the remaining tables across the multi-system environment (step 416). If, instead, the TCB indicates that the thread is a resource waiter on a differing table for another resource (step 418), then the deadlock indicator (in this case, a bit) is activated for both the holding and the waiting entry in the table (step 420) and the current wait count is incremented (step 422). Next (or alternatively to step 418), the PSW of the examined thread is compared against the TCB's current PSW (step 424). If the PSWs are the same, and there is a waiting resource (step 426), then the current wait count is incremented (step 428). If not, the new PSW is stored in the table and the current wait count is reset (step 430).

If the monitoring mechanisms detect a resource waiter (step 432), the system table the resource waiter corresponds to is also examined for a corresponding resource holder (step 434). If no holder is detected in the same table (step 436), then the resource waiter information is sent to all other job instances (e.g., all SMSVSAM instances) on additional systems (step 438) as previously described.

The method 400 waits (step 442) for an expiration of the interval value. When this occurs (step 440), the method 400 queries whether any of the resource waiters show no proof of waiting on any of the other known resources (step 444). If this is true, then the resource waiter (the corresponding thread) is restarted using the thread's original input parameters (step 446). The method aggregates all of the holders and waiters having an active deadlock indicator (step 448) as previously described. As a following step, the list of aggregated holders/waiters is parsed through to determine an original resource holder and waiter, if any (step 450). If a holder is determined to be not waiting on another resource (step 452), it is removed from the aggregate list (step 454). If the original resource holder ultimately located (step 456) (again, indicating a system deadlock), the resource holder associated with the system deadlock having a lowest current wait time is restarted (step 458) to resolve the deadlock. Corresponding threads to the identified deadlock are removed (step 460) and the method 400 continues parsing through remaining entries in the aggregated list (step 462, returning to step 450) until no additional entries are found. The method then ends (step 464).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for reducing deadlock in multi-system computing environments by a processor device in communication with a memory device, comprising:
    initializing a set of default, current wait times for resource requests of each of a plurality of resources;
    monitoring a plurality of resource holders and resource waiters within an address space of the multi-system computing environment, wherein if one resource holder of the plurality of resource holders of one of the plurality of resources is determined to be one resource waiter on another of the plurality of resources, a current wait time for the one resource holder is incremented and a deadlock indicator for both the one resource holder and the one resource waiter is activated; and
    subsequent to an expiration of a predefined interval:
        aggregating which of the plurality of resource holders and resource waiters have an active deadlock indicator,
        parsing through those of the plurality of resource holders and resource waiters to determine an original resource holder, indicating a system deadlock, and
        pursuant to detecting the system deadlock, restarting which of the plurality of resource holders associated with the system deadlock having a lowest current wait time.

2. The method of claim 1, further including constructing a set of tables for each of a plurality of resource types of the plurality of resources, wherein the set of tables is updated for occurrences of new resource holders and resource waiters in the plurality of resource holders and resource waiters.

3. The method of claim 2, wherein updating the set of tables includes performing at least one of categorizing a resource type for the one of the plurality of resources, designating a resource name of the one of the plurality of resources, listing a task control block (TCB) of the one of the plurality of resources, denoting a system of the multi-system computing environment to which the one of the plurality of resources belongs, and designating a thread one of the one resource holder and the one resource waiter.

4. The method of claim 1, wherein monitoring the plurality of resource holders and resource waiters further includes comparing a current program status word (PSW) of the one of the plurality of resources against a task control block (TCB) of the one of the plurality of resources.

5. The method of claim 1, wherein monitoring the plurality of resource holders and resource waiters further includes, pursuant to determining that the one resource holder and the one resource waiter are not co-existent on a single system, sending the one resource waiter to each additional instance performing the monitoring on additional systems.

6. The method of claim 5, wherein the monitoring the plurality of resource holders and resource waiters further includes, pursuant to determining by one of the system and the additional systems of an existence of the one resource waiter, sending the one resource holder to which of the system and the additional systems having the one resource waiter.

7. The method of claim 1, further including, subsequent to the expiration of the predefined interval, if the one resource waiter is determined not to be waiting for any of the plurality of resources, restarting the one resource waiter using at least one original input parameter.

8. A system embedded in a non-transitory computer-readable storage medium for reducing deadlock in multi-system computing environments, comprising:
    a deadlock monitoring module operable on at least one system in the multi-system computing environment, and in communication with additional systems in the multi-system computing environment, the deadlock monitoring module adapted for:
        initializing a set of default, current wait times for resource requests of each of a plurality of resources;
        monitoring a plurality of resource holders and resource waiters within an address space of the multi-system computing environment, wherein if one resource holder of the plurality of resource holders of one of the plurality of resources is determined to be one resource waiter on another of the plurality of resources, a current wait time for the one resource holder is incremented and a deadlock indicator for both the one resource holder and the one resource waiter is activated; and
        subsequent to an expiration of a predefined interval:
            aggregating which of the plurality of resource holders and resource waiters have an active deadlock indicator,
            parsing through those of the plurality of resource holders and resource waiters to determine an original resource holder, indicating a system deadlock, and
            pursuant to detecting the system deadlock, restarting which of the plurality of resource holders associated with the system deadlock having a lowest current wait time.

9. The system of claim 8, wherein the deadlock monitoring module is further adapted for constructing a set of tables for each of a plurality of resource types of the plurality of resources, wherein the set of tables is updated for occurrences of new resource holders and resource waiters in the plurality of resource holders and resource waiters.

10. The system of claim 9, wherein the deadlock monitoring module is further adapted for, pursuant to updating the set of tables, performing at least one of categorizing a resource type for the one of the plurality of resources, designating a resource name of the one of the plurality of resources, listing a task control block (TCB) of the one of the plurality of resources, denoting a system of the multi-system computing environment to which the one of the plurality of resources belongs, and designating a thread one of the one resource holder and the one resource waiter.

11. The system of claim 8, wherein the deadlock monitoring module is further adapted for, pursuant to monitoring the plurality of resource holders and resource waiters, comparing a current program status word (PSW) of the one of the plurality of resources against a task control block (TCB) of the one of the plurality of resources.

12. The system of claim 8, wherein the deadlock monitoring module is further adapted for, pursuant to determining that the one resource holder and the one resource waiter are not co-existent on the at least one system, sending the one resource waiter to each additional instance performing the monitoring on the additional systems.

13. The system of claim 8, wherein the deadlock monitoring module is further adapted for, pursuant to determining by one of the at least one system and the additional systems of an existence of the one resource waiter, sending the one resource holder to which of the at least one system and the additional systems having the one resource waiter.

14. The system of claim 8, further including, subsequent to the expiration of the predefined interval, if the one resource waiter is determined not to be waiting for any of the plurality of resources, restarting the one resource waiter using at least one original input parameter.

15. A computer program product for reducing deadlock in multi-system computing environments, the computer program product comprising a non-transitory computer-readable storage medium having computer-readable program code portions stored therein, the computer-readable program code portions comprising:
   a first executable portion for initializing a set of default, current wait times for resource requests of each of a plurality of resources;
   a second executable portion for monitoring a plurality of resource holders and resource waiters within an address space of the multi-system computing environment, wherein if one resource holder of the plurality of resource holders of one of the plurality of resources is determined to be one resource waiter on another of the plurality of resources, a current wait time for the one resource holder is incremented and a deadlock indicator for both the one resource holder and the one resource waiter is activated; and
   a third executable portion for, subsequent to an expiration of a predefined interval:
      aggregating which of the plurality of resource holders and resource waiters have an active deadlock indicator,
      parsing through those of the plurality of resource holders and resource waiters to determine an original resource holder, indicating a system deadlock, and
      pursuant to detecting the system deadlock, restarting which of the plurality of resource holders associated with the system deadlock having a lowest current wait time.

16. The computer program product of claim 15, further including a fourth executable portion for constructing a set of tables for each of a plurality of resource types of the plurality of resources, wherein the set of tables is updated for occurrences of new resource holders and resource waiters in the plurality of resource holders and resource waiters.

17. The computer program product of claim 16, further including a fifth executable portion for, pursuant to updating the set of tables, performing at least one of categorizing a resource type for the one of the plurality of resources, designating a resource name of the one of the plurality of resources, listing a task control block (TCB) of the one of the plurality of resources, denoting a system of the multi-system computing environment to which the one of the plurality of resources belongs, and designating a thread one of the one resource holder and the one resource waiter.

18. The computer program product of claim 15, further including a fourth executable portion for, pursuant to monitoring the plurality of resource holders and resource waiters, comparing a current program status word (PSW) of the one of the plurality of resources against a task control block (TCB) of the one of the plurality of resources.

19. The computer program product of claim 15, further including:
   a fourth executable portion for, subsequent to a determination that the one resource holder and the one resource waiter are not co-existent on a single system, sending the one resource waiter to each additional instance performing the monitoring on additional systems, and
   a fifth executable portion for, pursuant to determining by one of the system and the additional systems of an existence of the one resource waiter, sending the one resource holder to which of the system and the additional systems having the one resource waiter.

20. The computer program product of claim 15, further including a fourth executable portion for, subsequent to the expiration of the predefined interval, if the one resource waiter is determined not to be waiting for any of the plurality of resources, restarting the one resource waiter using at least one original input parameter.

* * * * *